(12) United States Patent
Shinoda

(10) Patent No.: US 7,551,540 B2
(45) Date of Patent: Jun. 23, 2009

(54) SOLID IMMERSION LENS, FOCUSING LENS USING SOLID IMMERSION LENS, OPTICAL PICKUP APPARATUS, OPTICAL RECORDING REPRODUCING APPARATUS AND METHOD OF MANUFACTURING SOLID IMMERSION LENS

(75) Inventor: Masataka Shinoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 663 days.

(21) Appl. No.: 11/205,075

(22) Filed: Aug. 17, 2005

(65) Prior Publication Data

US 2006/0077788 A1  Apr. 13, 2006

(30) Foreign Application Priority Data

Sep. 14, 2004 (JP) ............................. 2004-267397
Feb. 22, 2005 (JP) ............................. 2005-045736

(51) Int. Cl.
  *G11B 7/135* (2006.01)
(52) U.S. Cl. ................................. 369/112.23
(58) Field of Classification Search ............... 369/13.33
  See application file for complete search history.

(56) References Cited

U.S. PATENT DOCUMENTS

| 5,125,750 | A  | * | 6/1992  | Corle et al. ................. 359/819 |
| 5,729,393 | A  | * | 3/1998  | Lee et al. .................... 359/819 |
| 5,881,042 | A  | * | 3/1999  | Knight ......................... 369/99 |
| 5,936,928 | A  | * | 8/1999  | Jain et al. ..................... 369/99 |
| 6,091,694 | A  | * | 7/2000  | Spath ..................... 369/112.25 |
| 6,594,086 | B1 | * | 7/2003  | Pakdaman et al. .......... 359/656 |
| 6,671,246 | B1 | * | 12/2003 | Matsuo ................. 369/112.01 |
| 2005/0232120 | A1 | | 10/2005 | Shinoda |

\* cited by examiner

*Primary Examiner*—Peter Vincent Agustin
(74) *Attorney, Agent, or Firm*—Oblon, Spivak, McClelland, Maier & Neustadt, P.C.

(57) ABSTRACT

A convex portion is provided on the objective side of a solid immersion lens so as to protrude toward an optical recording medium and a difference-in-level portion or a concave portion is provided at least on a part of this convex portion. Then, there are provided a solid immersion lens for satisfactorily holding the bonding state of a lens holding member, a focusing lens using this solid immersion lens, an optical pickup apparatus, an optical recording and reproducing apparatus and a method of forming a solid immersion lens.

9 Claims, 11 Drawing Sheets

FIG. 4
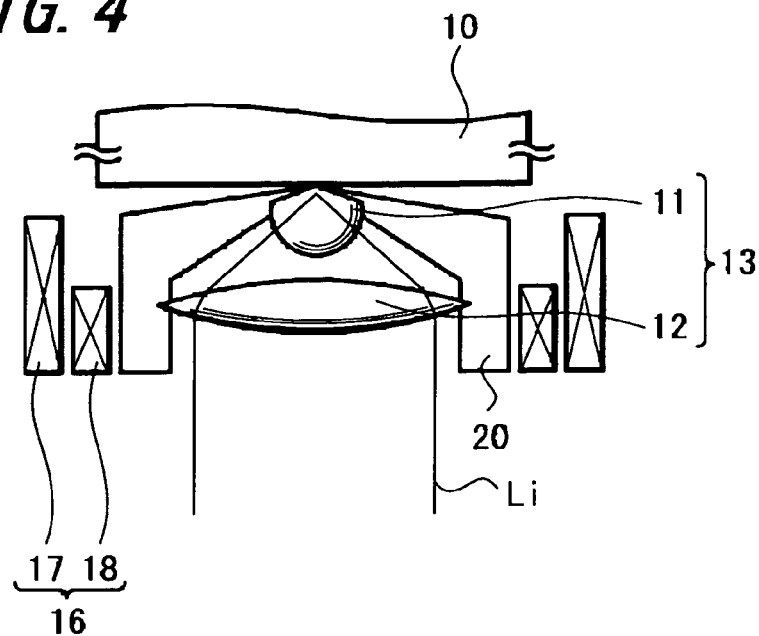
FIG. 5A
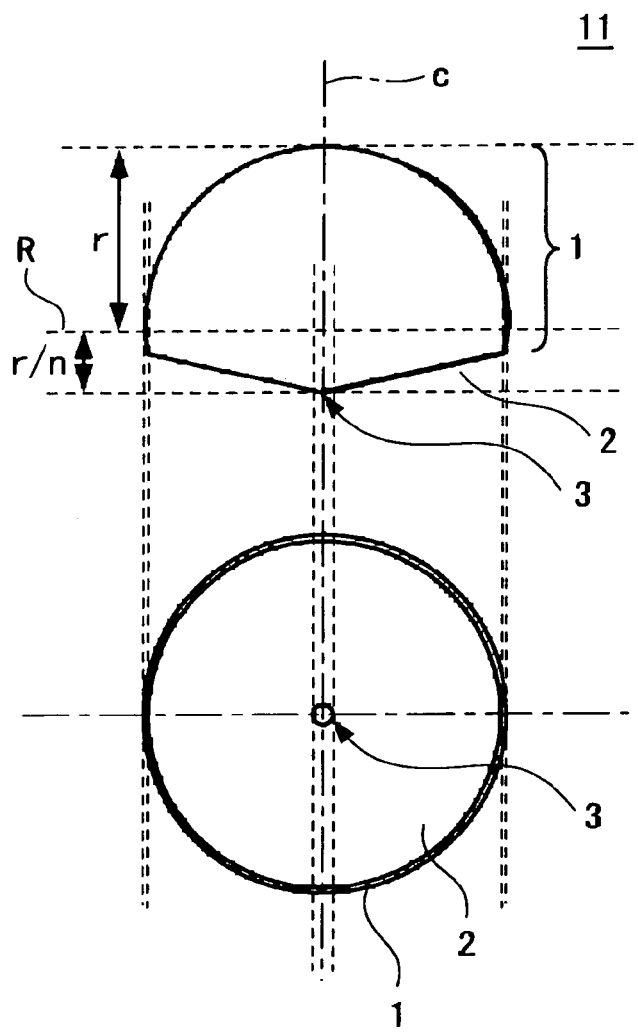
FIG. 5B

SOLID IMMERSION LENS, FOCUSING LENS USING SOLID IMMERSION LENS, OPTICAL PICKUP APPARATUS, OPTICAL RECORDING REPRODUCING APPARATUS AND METHOD OF MANUFACTURING SOLID IMMERSION LENS

CROSS REFERENCES TO RELATED APPLICATIONS

The present invention contains subject matter related to Japanese Patent Application JP 2004-267397 filed in the Japanese Patent Office on Sep. 14, 2004, Japanese Patent Application JP 2005-045736 filed in the Japanese Patent Office on Feb. 22, 2005, the entire contents of which being incorporated herein by reference.

BACKGROUND OF THE INVENTION

1. Field of the Invention

The present invention relates generally to a solid immersion lens (SIL), a focusing lens using such solid immersion lens, an optical pickup apparatus, an optical (or magneto-optical) recording and reproducing apparatus and a method of forming a solid immersion lens. More particularly, the present invention relates to a solid immersion lens suitable for use with a so-called near field optical recording and reproducing system in which a numerical aperture of a focusing lens is increased by using a material in which an optical lens has a large refractive index to thereby record and reproduce information on and from an optical (or magneto-optical) recording medium, a focusing lens using such solid immersion lens, an optical pickup apparatus, an optical recording and reproducing apparatus and a method of forming a solid immersion lens.

2. Description of the Related Art

Optical recording mediums (including a magneto-optical recording medium), which are represented by a compact disc (CD), a mini disc MD) and a digital versatile disc (DVD), are widely used as storage mediums for storing therein music information, video information, data, programs and the like. However, as music information, video information, data, programs and the like are increasingly improved to become higher in tone quality, image quality, become longer in record time and play time and also become larger in storage capacity, it is desired that optical recording mediums should be increased in storage capacity and that optical recording and reproducing apparatus (including magneto-optical recording and reproducing apparatus) capable of recording and reproducing such mass-storage optical recording mediums should be realized.

Accordingly, in order to meet with the above-mentioned requirements, in the optical recording and reproducing apparatus, a wavelength of a semiconductor laser, for example, of its light source is shortened and a numerical aperture of a focusing lens is increased and thereby a diameter of a spot of light beam converged through the focusing lens is reduced.

For example, with respect to semiconductor lasers, a GaN semiconductor laser which emits laser light of which wavelength is reduced from 635 nm of related-art red laser to 400 nm band was put into practice and thereby a diameter of a spot of light beam can be reduced. Also, with respect to wavelength which can be reduced more than the above-mentioned short wavelength, for example, a far ultraviolet solid-state laser which can continuously emit laser light of a single wavelength of 266 nm is now commercially available on the market (manufactured by Sony Corporation under the trade name of UW-1020A) and hence a diameter of a spot of laser light can be reduced more. In addition, a twice wave laser (266 nm band) of an Nd:YAG laser, a diamond laser (235 nm band), a twice wave laser (202 nm band) of a GaN laser and so on are now under study and development.

A so-called near field optical recording and reproducing system has been studied in which a focusing lens with a numerical aperture greater than 1 can be realized by using an optical lens with a large numerical aperture represented by a solid immersion lens (SIL) and in which recording and reproducing can be carried out by making the objective surface of this focusing lens become close to an optical recording medium with a distance of approximately 10/1 of a wavelength of its light source (see Cited Patent Reference, U.S. Pat. No. 5,125,750, for example).

In this near field optical recording and reproducing system, it is important to maintain a distance between the optical recording medium and the focusing lens in the optical contact state with high accuracy. Also, since a diameter of a bundle of light introduced into the focusing lens from the light source is reduced and the distance between the optical recording medium and the focusing lens is reduced to become very small, which is less than approximately several 10 s of nanometers, an inclination margin between the optical recording medium and the focusing lens, that is, so-called can become very small and hence it is unavoidable that the focusing lens is largely restricted from a shape standpoint.

FIG. 1 of the accompanying drawings is a schematic diagram showing an arrangement of an example of a solid immersion lens (SIL). As shown in FIG. 1, a solid immersion lens 11 and an optical lens 12 can be located, in that order, from the objective side such as an optical recording medium 10 (including a magneto-optical recording medium), thereby constructing a near field focusing lens. As shown in FIG. 1, the solid immersion lens 11 is formed like a hemispherical shape with a radius of curvature r or a hyper-hemispherical lens (hyper-hemispherical shape in the example of FIG. 1). When the solid immersion lens 11 is shaped like the hemispherical solid immersion lens, the thickness thereof extending along the optical axis is selected to be r. When the solid immersion lens 11 is shaped like the hyper-hemispherical solid immersion lens as in the illustrated example of FIG. 1, the thickness thereof extending along the optical axis is selected to be r (1+1/n) where n represents the refractive index.

When the focusing lens having the above-mentioned arrangement is applied to an optical recording and reproducing apparatus, for example, it is mounted on an optical pickup apparatus having a biaxial actuator and thereby a distance between the optical recording medium and the focusing lens can be maintained in an optical contact state. When the above-mentioned focusing lens is applied to magneto-optical recording, a magnetic head apparatus for use in magnetic recording and reproduction is assembled into the optical pickup apparatus and thereby a distance between the optical recording medium and the focusing lens can be similarly maintained in an optical contact state.

In the above-mentioned near field optical recording and reproducing system, in order to stably control the focusing lens which is driven in the focusing direction and/or tracking direction relative to the optical recording medium and also in order to stably record and reproduce the optical recording medium, it is necessary to hold a certain amount of a tilt margin between the optical recording medium and the objective surface of the focusing lens.

Accordingly, the assignee of the present application has previously proposed a solid immersion lens, disclosed in U.S.

patent application Ser. No. 11/073,608, in which a convex portion, for example, a convex portion such as a circular cone-like convex portion and a pyramid-like convex portion is formed on the objective side of the solid immersion lens and its tip end portion is processed as a planar portion to provide an objective surface so that, even when a distance between the objective surface and the optical recording medium is selected to be about several 10 s of nanometers, a tilt margin of approximately ±0.1 degrees can be maintained. Thus, it is possible to provide an optical pickup apparatus and an optical recording and reproducing apparatus in which recording and reproducing characteristics can be stabilized.

In the solid immersion lens having the convex portion formed on the objective side as described above, as the numerical aperture NA of the solid immersion lens is increased, that is, incidence angle of laser light is increased, a processed angle of the convex portion should be decreased so as not to disturb the incident light path of laser light. For example, when the solid immersion lens is shaped like the circular cone solid immersion lens, an angle of apex angle of the cone should be increased.

As a result, a bonding area of the solid immersion lens with a lens holding member for holding a solid immersion lens with a large numerical aperture NA is decreased, and there is a risk that the lens holding member will be detached from the solid immersion lens with application of a very small shock.

Similarly, the bonding area of the solid immersion lens with the lens holding member for holding this solid immersion lens is decreased as the radius of the spherical portion of the solid immersion lens is decreased or as a refractive index of the solid immersion lens is increased. Further, the above-mentioned bonding area is similarly decreased as the radius of the light-concentrating flat surface portion (that is, objective surface) at the tip end of the convex portion is increased.

In particular, in order to meet with the requirements in which the optical recording medium will be made high in density and in which the optical pickup apparatus will be made compact in size and will be made light in weight in the future, the numerical aperture of the solid immersion lens should be increased and the solid immersion lens should be microminiaturized. Therefore, even when the bonding area of the solid immersion lens with the lens holding member for holding the solid immersion lens can be decreased so much, the solid immersion lens should be stably fixed and held.

SUMMARY OF THE INVENTION

In view of the aforesaid aspects, the present invention intends to provide a solid immersion lens for satisfactorily holding the bonding state between the solid immersion lens and a lens holding member, a focusing lens using such solid immersion lens, an optical pickup apparatus, an optical recording and reproducing apparatus and a method of forming a solid immersion lens.

According to an aspect of the present invention, there is provided a solid immersion lens which is comprised of a convex portion provided on the objective side of the solid immersion lens and a difference-in-level portion or a concave portion provided at least on a part of the convex portion.

According to other aspect of the present invention, there is provided a focusing lens which is comprised of a solid immersion lens, an optical lens with an optical axis thereof being coincident with the solid immersion lens and which is located on the opposite side of the objective side, a convex portion protrusively provided on the objective side of the solid immersion lens and a difference-in-level portion or a concave portion being provided at least on a part of the convex portion.

According to a further aspect of the present invention, there is provided an optical pickup apparatus which is comprised of at least a solid immersion lens and an optical lens with optical axes thereof being coincident with a light source and which are sequentially located from the objective side, a focusing lens for converging light emitted from the light source to form a beam spot, a convex portion provided on the objective side of the solid immersion lens so as to protrude toward an optical recording medium and a difference-in-level portion or a concave portion being provided at least on a part of the convex portion.

In accordance with yet a further aspect of the present invention, there is provided an optical recording and reproducing apparatus which is comprised of at least an optical pickup apparatus for concentrating light at the recording position of an optical recording medium by a focusing lens to record and/or reproduce the optical recording medium and a control drive device for moving the focusing lens and the optical pickup apparatus in the focusing direction and/or tracking direction of the optical recording medium, the focusing lens including at least a solid immersion lens located on the objective side, a convex portion being provided on the objective side of the solid immersion lens so as to protrude toward the optical recording medium and the convex portion having a difference-in-level portion or a concave portion provided at least on a part thereof.

In accordance with still a further aspect of the present invention, there is provided a method of forming a solid immersion lens comprising the steps of forming a convex portion on the objective side of the solid immersion lens and forming a difference-in-level portion or a concave portion at least on a part of the convex portion by a focus ion beam processing method.

As described above, according to the solid immersion lens of the present invention, since the protrusive convex portion is provided on the object side of the solid immersion lens and the difference-in-level portion or the concave portion is provided at least on a part of this convex portion, the bonding area with the lens holding member can be increased and hence the solid immersion lens can be held by the lens holding member more stably as compared with the related art.

Further, according to the focusing lens, the optical pickup apparatus and the optical recording and reproducing apparatus of the present invention, the solid immersion lens for use with the focusing lens can be held stably and hence it is possible to provide an optical pickup apparatus and an optical recording and reproducing apparatus which can be stably transported relative to the optical recording medium by using the solid immersion lens with the large numerical aperture.

Furthermore, according to a method of forming a solid immersion lens of the present invention, a solid immersion lens which can stably be held comparatively can be formed with high accuracy without exerting an influence on incident light.

BRIEF DESCRIPTION OF THE DRAWINGS

FIG. 4 is a diagram schematically showing an arrangement of a main portion of an example of an optical recording and reproducing apparatus according to the present invention;

FIG. 5A is a schematic side view showing an example of a solid immersion lens which can be applied to the present invention;

FIG. 5B is a schematic plan view showing an example of a solid immersion lens which can be applied to the present invention;

DESCRIPTION OF THE PREFERRED EMBODIMENTS

While the embodiments of the present invention will be described below with reference to the drawings, it is needless to say that the present invention is not limited to the following embodiments.

The present invention can be applied to a focusing lens composed of a solid immersion lens and an optical lens with its optical axis coincident with that of the solid immersion lens and which is located on the opposite side of the objective side. Further, the present invention can be applied to an optical pickup apparatus including this focusing lens and which uses a so-called near field optical recording and reproducing system and an optical recording and reproducing apparatus including this optical pickup apparatus.

Figure 1:
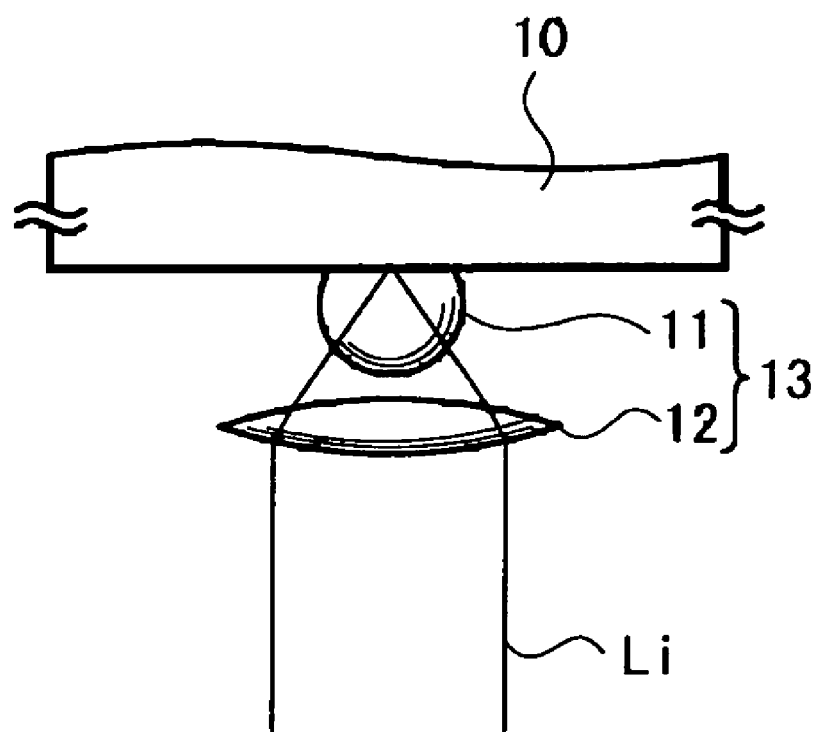
FIG. 1 is a diagram schematically showing an arrangement of an example of a focusing lens using a solid immersion lens (SIL) according to the related art.
Figure 2:
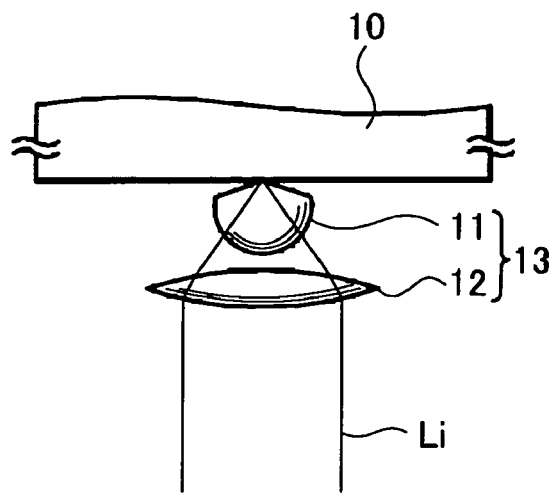
FIG. 2 is a diagram schematically showing an arrangement of an example of a focusing lens according to the present invention.
Figure 3:
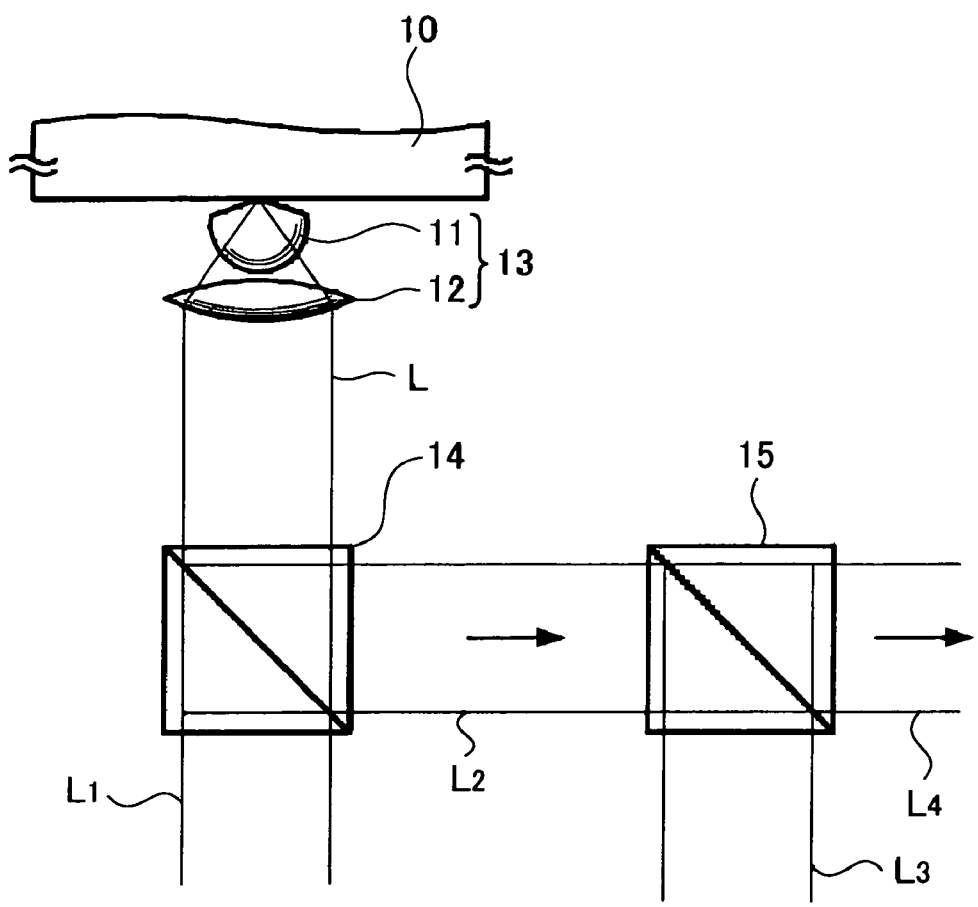
FIG. 3 is a diagram schematically showing an arrangement of a main portion of an example of an optical pickup apparatus according to the present invention.

Prior to the description of the solid immersion lens according to the present invention, the embodiments in which the present invention is applied to the focusing lens, the optical pickup apparatus and the optical recording and reproducing apparatus will be described with reference to FIGS. 2 to 4. In FIGS. 2 to 4, a shape of a solid immersion lens is such one provided by simplifying an example of an arrangement according to the present invention in order to facilitate explanation of the layout and arrangement of the solid immersion lens. It is needless to say that the shape of this solid immersion lens can take shapes of arrangements of the present invention including examples of FIGS. 5A and 5B and the following drawings.

FIG. 2 is a schematic diagram of an arrangement showing an example of a focusing lens using a solid immersion lens according to the present invention. As shown in FIG. 2, the solid immersion lens 11 and the optical lens 12 according to the arrangement of the present invention are located, in that order, in an opposing relation to the lens object, for example, the optical recording medium in such a manner that their optical axes may become coincident with each other. The solid immersion lens 11 is formed like a hemispherical shape or hyper-hemispherical shape with a radius of curvature r. A thickness thereof extending along its optical axis is selected to be r when the solid immersion lens is formed as the hemispherical shape. When the solid immersion lens 11 is formed like the hyper-hemispherical shape as in the illustrated example, if a refractive index is selected to be n, a thickness thereof extending along its optical axis is selected to be r (1+1/n). According to this arrangement, it is possible to provide a focusing lens 13 with a high numerical aperture exceeding the numerical aperture NA of the optical lens 12.

While the solid immersion lens 11 and the optical recording medium 12 are not brought in contact with each other in actual practice, a space between the solid immersion lens 11 and the optical recording medium 10 is sufficiently small as compared with the thickness of the solid immersion lens 11 so that such small space is not shown in FIGS. 2 to 4. A distance between the solid immersion lens 11 and the optical recording medium 10 is shorter than a wavelength of laser light emitted from a light source. To be concrete, when a wavelength of laser light is 405 nm, a distance between the solid immersion lens 11 and the optical recording medium 10 is placed in the state in which they may become very close to each other as in the distance of 85 nm or 25 nm.

FIG. 3 is a schematic diagram of an arrangement showing an example of an arrangement of an optical system of an optical pickup apparatus using the solid immersion lens and the focusing lens shown in FIG. 2. First and second beam splitters 14 and 15, for example, are located between a light source and a photodetector, although not shown, and the focusing lens 13 composed of the solid immersion lens 11 and the optical lens 12. The optical recording medium 10 is mounted on a spindle motor (not shown) and rotated at a predetermined revolution rate if it is shaped like a disc, for example.

Also, the optical pickup apparatus shown in FIGS. 2 and 3 is provided with means for moving the focusing lens 13 in the tracking direction and the focusing direction.

As these means, there may be enumerated a biaxial actuator for use with a general optical pickup, a slider for use with a magnetic head apparatus and the like.

Examples of these control drive means for use with the focusing lens 13 will be described next.

FIG. 4 is a schematic diagram of an arrangement showing an example of an optical pickup apparatus constructing a part of the optical recording and reproducing apparatus according to the present invention, that is, an example of an optical pickup apparatus using a biaxial actuator as the control drive means. As shown in FIG. 4, the focusing lens 13 is fixed by a holding member 20 such that optical axes of the solid immersion lens 11 and the optical lens 12 may become coincident with each other. This holding member 20 is fixed to a biaxial actuator 16 which can be driven in the focusing direction and/or the tracking direction.

As shown in FIG. 4, the biaxial actuator 16 is composed of a tracking coil 17 for driving the focusing lens 13 in the tracking direction and a focusing coil 18 for driving the focusing lens 13 in the focusing direction.

Then, this biaxial actuator 16 is able to control the distance between the optical recording medium 10 and the solid immersion lens 11 by monitoring a quantity of returned light, for example, so that resultant distance information may be fed back. As a result, a distance between the solid immersion lens 11 and the optical recording medium 10 can be kept substantially constant, and also the solid immersion lens 11 and the optical recording medium 10 can be prevented from colliding with each other.

Also, this biaxial actuator 16 is able to move a focused beam spot to a desired recording track by monitoring a quantity of returned light in the tracking direction so that resultant position information may be fed back.

Referring back to FIG. 3, the schematic arrangement of the optical pickup apparatus will be described below. As shown in FIG. 3, outward light emitted from a light source, for example, a semiconductor laser is collimated to parallel light (L1) by a collimator lens (not shown), passed through the first beam splitter 14 (L) and converged on the information recording surface of the optical recording medium 10 by the focusing lens 13. Inward light reflected on the information recording surface is passed through the focusing lens 13, reflected by the first beam splitter 14 (L2) and thereby introduced into the second beam splitter 15. Then, inward lights (L3 and L4) separated by this second beam splitter 15 are focused on a focusing photodetector (not shown) and a signal photodetector (not shown) and thereby a focusing error signal, a reproduced pit signal and the like are detected.

Also, inward light reflected by the second beam splitter 15 is focused on the tracking photodetector, for example, and thereby a tracking error signal is detected. If necessary, in this optical pickup apparatus, in order to remove disc rotation fluctuations from the optical recording medium 10, a relay lens (not shown) capable of correcting a focusing error component which the biaxial actuator 16 to which the focusing lens 13 is fixed may not fully follow and an error component generated upon assembly process of the focusing lens by changing a space between two lenses may be inserted between the first beam splitter 14 and the optical lens 12.

Although not shown, when a focusing lens is mounted on a slider, as the means for correcting the remaining focus error component followed by the slider and the error component produced upon assembly process of the focusing lens, the focusing lens may be fixed to the slider and the optical lens may be moved in the optical axis direction by a suitable means such as a piezoelectric element.

Also, in the case of an optical recording and reproducing apparatus in which a spindle motor includes a means to which a plurality of optical recording mediums is mounted, it is suitable that the slider may include a mirror for bending an optical axis substantially 90 degrees. Since the optical recording and reproducing apparatus having the above-mentioned arrangement can decrease a space between optical recording mediums, it is thus possible to make the apparatus become small in size and become thin in thickness.

The above-described optical pickup apparatus may contain a reproducing optical pickup apparatus designed exclusively only for reproducing information, a recording optical pickup apparatus designed exclusively only for recording information and a recording and reproducing optical pickup apparatus designed for recording and reproducing information. The above-mentioned respective optical pickup apparatus may be modified such that a magnetic coil and the like may be assembled into a part of the optical pickup apparatus. This relationship will apply for a thermomagnetic recording and reproducing system as well. Also, the optical recording and reproducing apparatus may contain a reproducing apparatus designed exclusively for only reproducing information, a recording apparatus designed exclusively for only recording information and a recording and reproducing apparatus capable of recording and reproducing information.

Next, examples of lens shapes which can be suitably applied to a solid immersion lens according to the present invention will be described.

FIGS. 5A and 5B are a schematic side view and a schematic plan view of an example of a solid immersion lens according to the present invention. In this example, the spherical portion 1 is shaped like a hyper-spherical portion, and there is provided the solid immersion lens 11 in which a radius of curvature is assumed to be r, a refractive index is assumed to be n and a thickness in the direction extending along an optical axis c is assumed to be $r(1+1/n)$. The convex portion 2 which protrudes toward the optical recording medium is provided on the objective side.

In FIGS. 5A and 5B, a broken line R denotes a cross-section in which a radius becomes r in the cross-section which is perpendicular to the optical axis of the solid immersion lens 11.

In this solid immersion lens 11, the convex portion 2 may be shaped like a circular cone portion or a pyramidal portion.

Figures 6A, 6B:
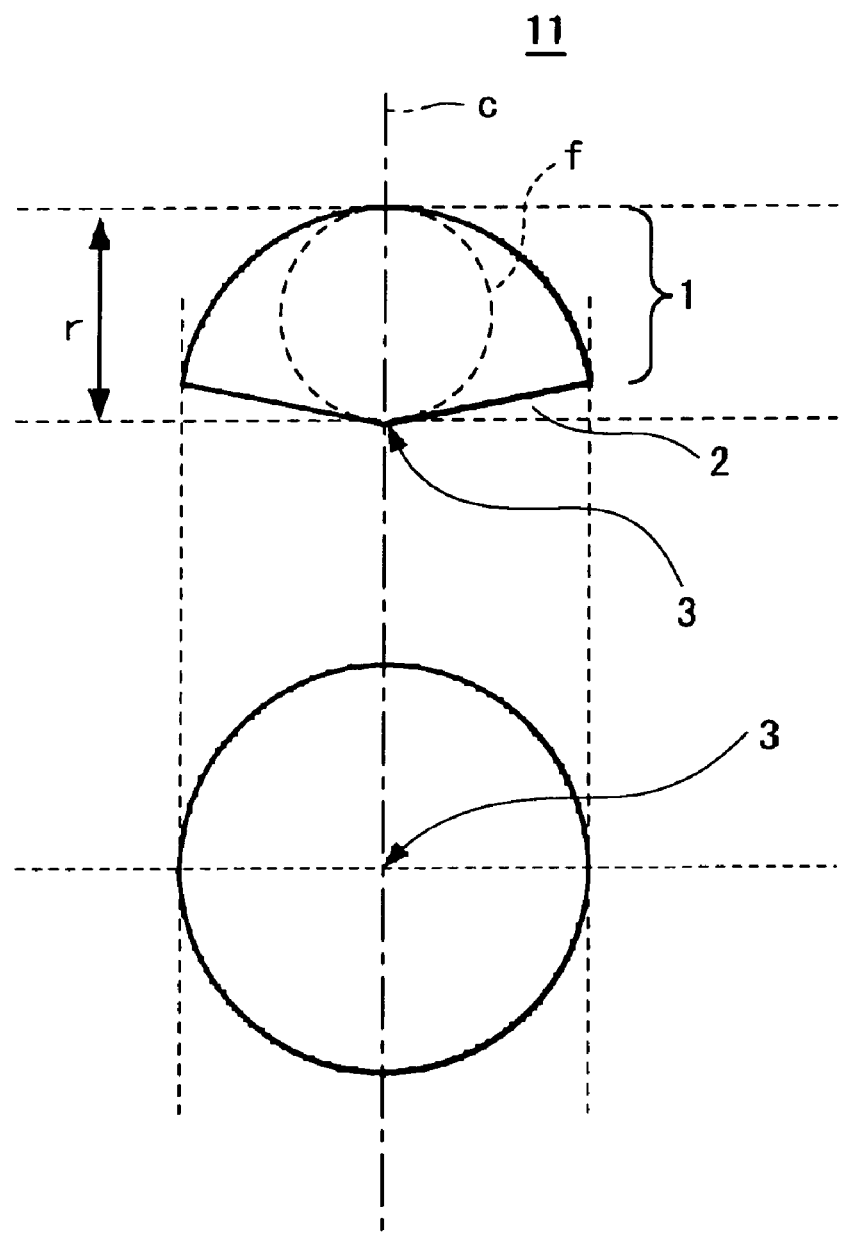
FIG. 6A is a schematic side view showing other example of a solid immersion lens which can be applied to the present invention.
FIG. 6B is a schematic plan view showing other example of a solid immersion lens which can be applied to the present invention.

In addition, as shown in FIGS. 6A and 6B, the spherical portion 1 may be shaped like a hemispherical portion of which thickness is selected to be r, and the convex portion is shaped like substantially a circular cone or a pyramidal portion. In this case, the objective surface 3 at the tip end portion may be formed as a shape which substantially circumscribes a sphere, shown by a broken line f, with a radius thereof being substantially r/2. In this case, there is an advantage in which even when an optical axis of incident light such as laser light is slightly inclined from the optical axis of the solid immersion lens 11, a distance in which incident light passes the solid immersion lens 11 can be prevented from being changed so that the incident light can be concentrated on the objective surface satisfactorily.

Figures 7A, 7B:
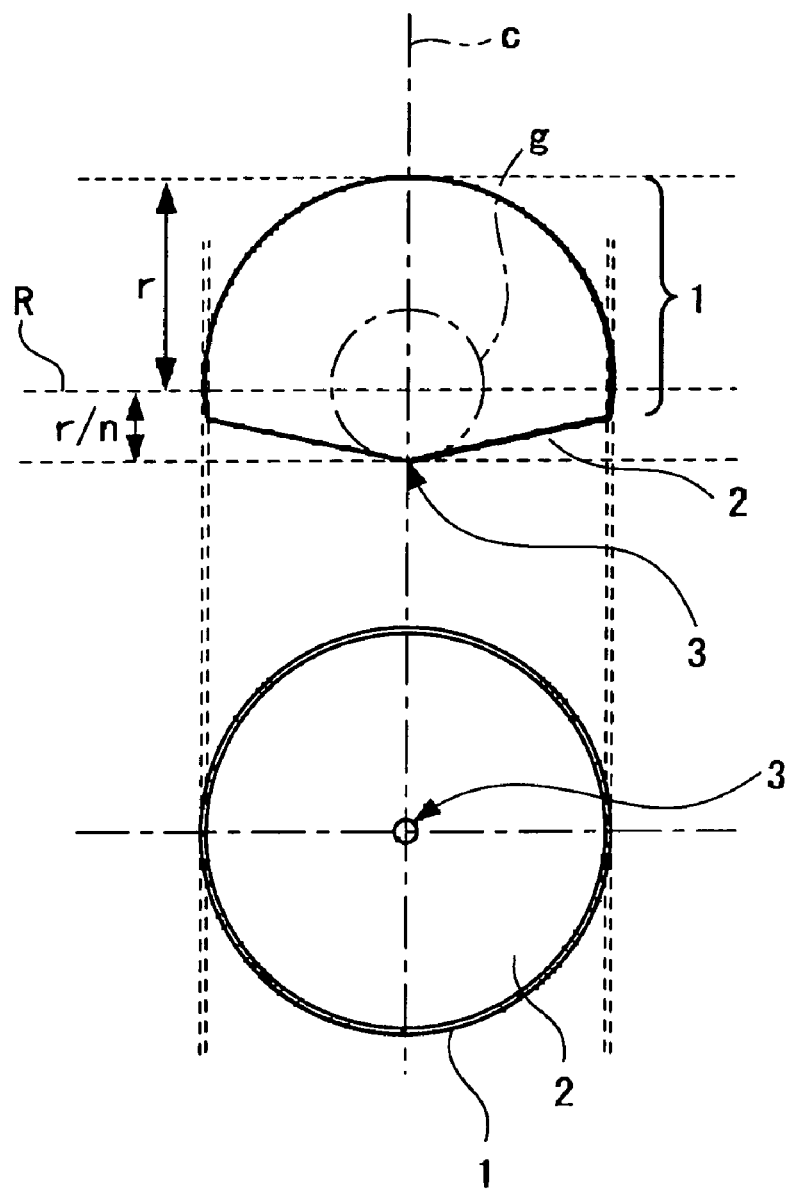
FIG. 7A is a schematic side view showing a further example of a solid immersion lens which can be applied to the present invention.
FIG. 7B is a schematic plan view showing a further example of a solid immersion lens which can be applied to the present invention.

Also, as shown in FIGS. 7A and 7B, the spherical portion 1 may be formed as a hyper-spherical portion, the convex portion 2 may be formed as substantially a circular cone shape or a pyramidal shape and the objective surface 3 at the tip end portion may be formed as a shape which substantially circumscribes a sphere, shown by a dot-and-dash line g, of which radius, for example, is nearly r/n. Also in this case, there is an advantage in which, even when an optical axis of incident light such as laser light is slightly inclined from the optical axis of the solid immersion lens 11, a distance in which incident light passes the solid immersion lens 11 can be prevented from being changed so that the incident light can be concentrated on the objective surface satisfactorily.

Figure 8A:
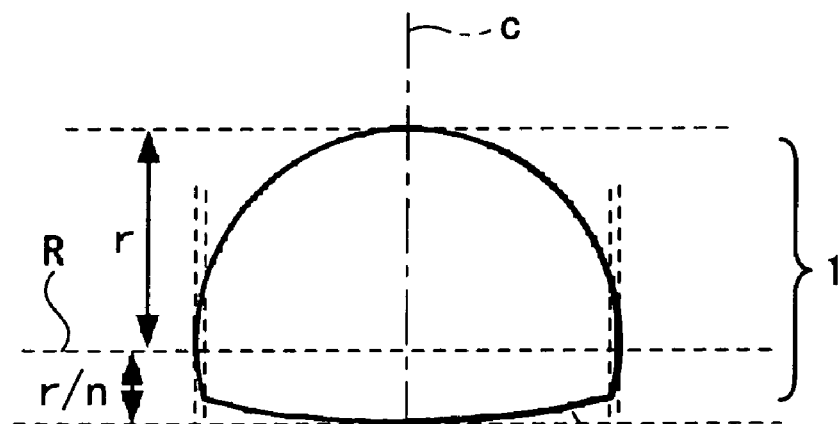
FIG. 8A is a schematic side view showing yet a further example of a solid immersion lens which can be applied to the present invention.
Figure 8B:
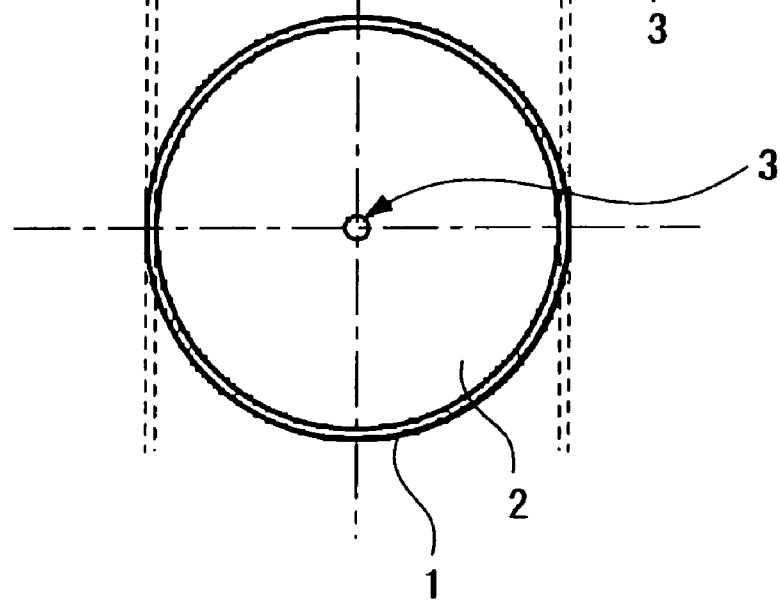
FIG. 8B is a schematic plan view showing yet a further example of a solid immersion lens which can be applied to the present invention.

Further, as shown in FIGS. 8A and 8B, the convex portion 2 may be formed as various kinds of curved surfaces containing a spherical surface, for example.

In FIGS. 6A and 6B, FIGS. 7A and 7B and FIGS. 8A and 8B, elements and parts identical to those of FIGS. 5A and 5B are denoted by identical reference numerals and therefore need not be described.

The inclination angle of the convex portion 2 is set to be larger than an angle of incidence so as not to disturb incident light from a laser. When a lens material of which refractive index lies in a range of from approximately 2 to 3 is in use, its angle falls within a range of from substantially 10 to 30 degrees from the objective surface 3.

Also, since a near field optical recording and reproducing system relative to the optical recording medium requires a magnetic field upon recording and/or reproduction, it is possible to attach a suitable device such as a magnetic coil on a part of or around the objective surface 3 of the solid immersion lens 11.

As a material of such solid immersion lens 11, a material having a large refractive index, a large transmittance and a small photoabsorption relative to a wavelength of a laser light source of the optical recording and reproducing apparatus and the optical pickup apparatus may be suitably used as mentioned above. For example, S-LAH79 (trade name), manufactured by OHARA INC., which is a high refractive index glass, $Bi_4Ge_3O_{12}$, $SrTiO_3$, $ZrO_2$, $HfO_2$, Sic, $KTaO_3$, diamond which are high refractive index ceramics and high refractive index single crystal materials may be suitable materials.

Also, it is desirable that these lens materials should have amorphous structure or that they should have cubic structure if they are single crystal materials. If the lens material has the amorphous structure of the cubic structure, then since an etch rate and an etch characteristic are not changed by the crystal azimuth, an etching method and an etching system for use in processing well-known semiconductors are available.

Then, in the solid immersion lens according to the present invention, a difference-in-level portion or a concave portion is provided at least on a part of its convex portion.

When such difference-in-level portion or the concave portion is processed, if a difference-in-level portion is composed of more than two inclined surfaces with depths of concave portions or different inclination angle relative to the optical axis in the cross-section extending along the optical axis of the solid immersion lens, an etching method and an etching system utilized in semiconductor processing are available for processing the inclination angle of the inclined plane with high accuracy. In particular, when an inclination angle of a very small inclined portion or concave and convex shapes are processed, it is preferable that they should be processed by using a focus ion beam processing method based on a focus ion beam processing system such as a focus ion beam processing inspection system FB-2100 (trade name) made by HITACCHI LTD., for example. When the slant face, the curved surface and the like are formed by the focus ion beam processing method, there is an advantage in which the inclination angle and the like can be adjusted with high accuracy and in which the difference-in-level portion or the concave portion can be reliably processed without affecting incident light.

Next, prior to describing effects achieved by the difference-in-level portion and the concave portion of the solid immersion lens according to the present invention, the manner in which the solid immersion lens and the holding member are bonded together will be described with reference to the drawings.

Figure 9:
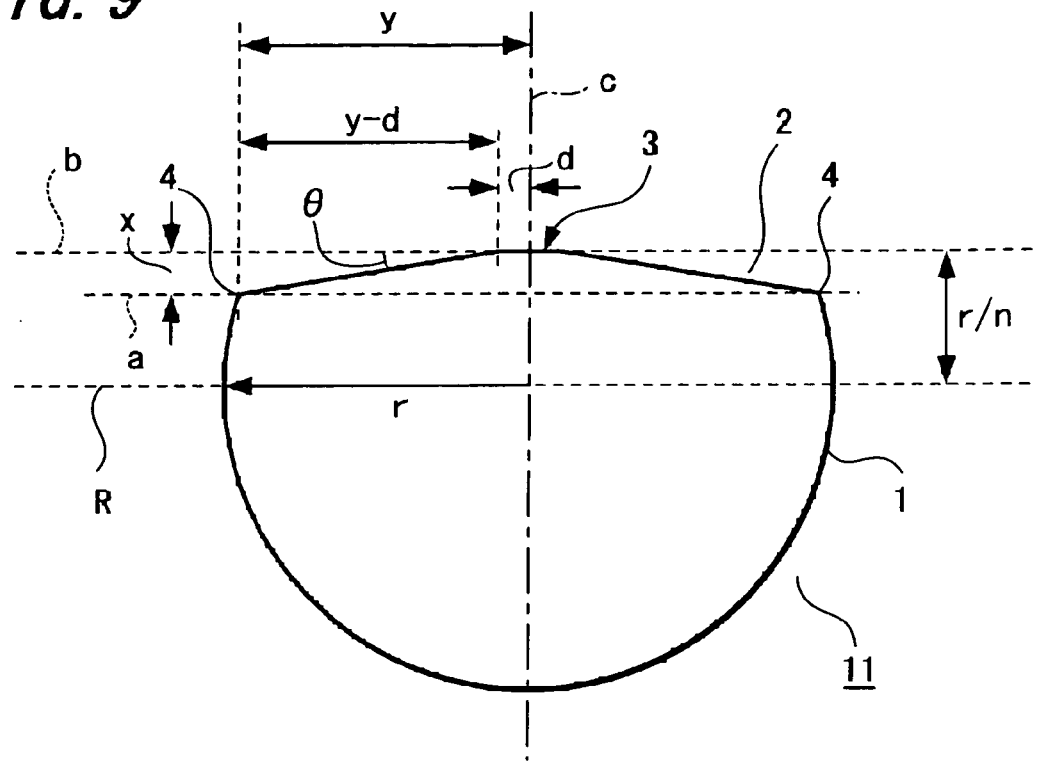
FIG. 9 is a schematic side view showing an example of a solid immersion lens.

FIG. 9 shows an enlarged cross-sectional view of an arrangement of a main portion of an example of the solid immersion lens 11 having the spherical portion 1 and the convex portion 2 of the circular cone shape or the pyramidal shape. As shown in FIG. 9, in this example, the spherical portion 1 is shaped like the hyper-hemispherical portion in which its radius of curvature is assumed to be r, an angle of the surface (shown by a broken line b) along the objective surface 3 of the inclined portion in the cross-section extending along the optical axis c of the convex portion 2 is assumed to be θ, the radius of the objective surface 3 is assumed to be d, the thickness of the solid immersion lens 11 is assumed to be r (1+1/n), the height from the objective surface 3 of the convex portion 2 to the edge portion 4 of the spherical portion 1 is assumed to be x, a distance from the optical axis to the edge portion 4 is assumed to be y and a refractive index in the wavelength available in the solid immersion lens 11 is assumed to be n. In FIG. 9, a broken line a denotes a cross-section which crosses the edge portion 4 of the spherical portion 1, and a broken line R denotes a cross-section in which a radius becomes r in the cross-section which is perpendicular to the optical axis c.

At that time, a relation ship between the inclination angle θ and a height x from the objective surface 3 to the spherical portion 1 is calculated from the following equations (1) and (2):

$$\tan \theta = x/(y-d) \quad (1)$$

$$r^2 = y^2 + ((r/n)-x)^2 \quad (2)$$

For example, when the radius r is selected to be 0.45 mm, the radius d of the objective surface 3 is selected to be 20 μm and the refractive index n of the lens is selected to be 2.075, the height from the objective surface 3 to the edge portion 4 of the spherical portion 1, that is, a height difference x was calculated while the inclination angle θ was being changed in a range of from 10 degrees to 30 degrees.

The lens holding member is bonded to the lens in such a manner that its surface (surface opposing the optical recording medium) is spaced apart from the lens objective surface 3 with a certain amount of margin. In this margin, when a height difference between the lens holding member surface and the lens objective surface is 50 μm, a height (height difference) x' of the bonding area between the lens holding member and the lens becomes a value which results from subtracting 50 μm from the above-described height difference x and a length y' of the bonding area in the cross-section shown in FIG. 9 is obtained from y'=x'/(sin θ). The calculated results are shown on the following table 1.

TABLE 1

| Inclination angle θ (degree) | Height difference from objective surface of edge portion x (μm) | Height difference of bonding portion x' (μm) | Length of bonding portion y' (μm) |
|---|---|---|---|
| 10 | 71.6 | 21.6 | 124.4 |
| 15 | 111.9 | 61.9 | 239.1 |
| 20 | 155 | 105 | 307 |
| 25 | 200.4 | 150.4 | 355.9 |
| 30 | 247.7 | 197.7 | 395.4 |

As is clear from the results on this table 1, when the inclination angle θ of the convex portion 2 is 30 degrees, the height difference from the objective surface 3 to the spherical portion 1 of approximately 250 μm can be maintained. However, when the inclination angle θ is 10 degrees, the height difference from the objective surface 3 to the edge portion 4 of the spherical portion 1 of approximately 70 μm can be maintained at most. A study of this reveals that the height difference x from the objective surface 3 to the edge portion 4 of the spherical portion 1 is decreased as the inclination angle θ is decreased and the height difference x' and the length y' of the bonding area also is decreased.

In the solid immersion lens, as the numerical aperture NA is increased, that is, the inclination angle of laser is increased or as the radius r of the solid immersion lens is decreased and as the refractive index n is increased, the inclination angle θ of the convex portion 2 is decreased. Therefore, it is clear that the height from this objective surface 3 to the edge portion 4 of the spherical portion 1 is decreased as the numerical aperture NA of the solid immersion lens is increased and the solid immersion lens is decreased in size and in weight.

Figure 10:
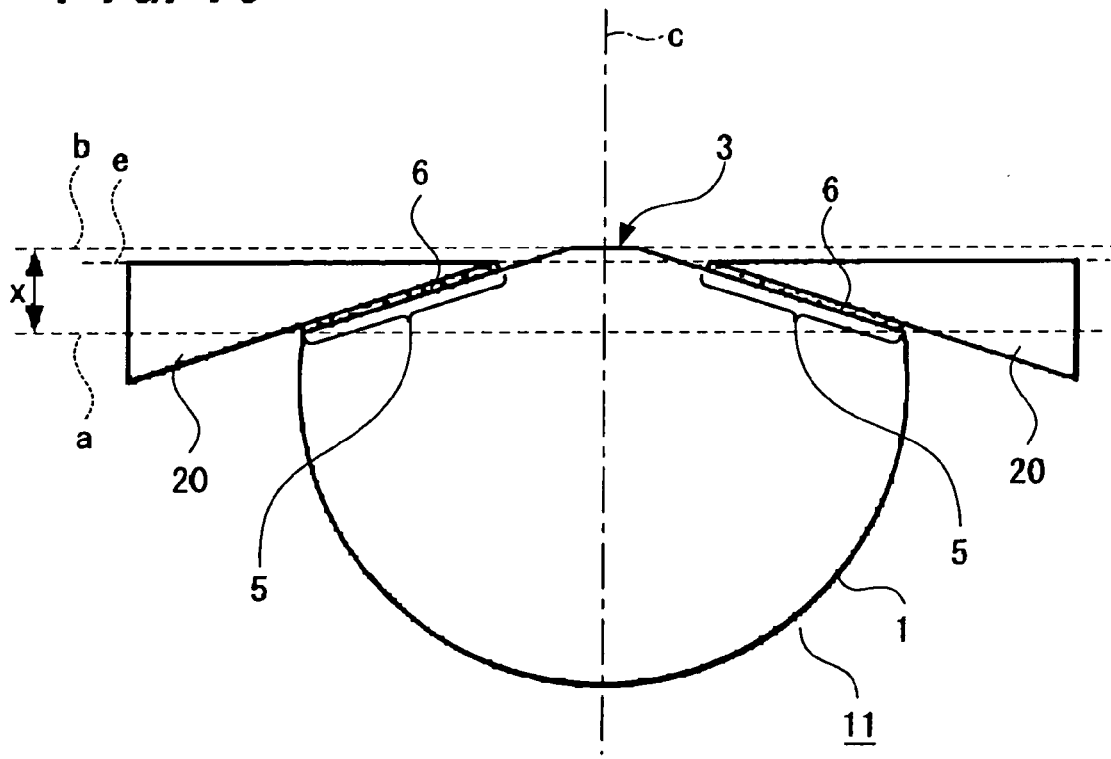
FIG. 10 is a schematic diagram of an arrangement showing the state in which an example of a solid immersion lens is held by a holding member.
Figure 11:
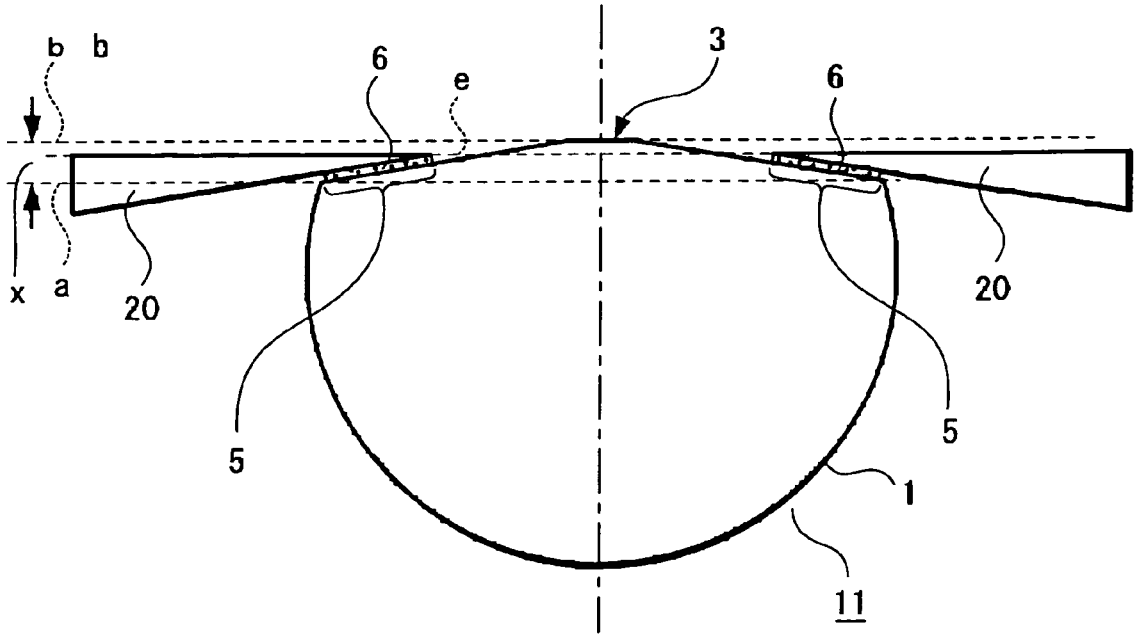
FIG. 11 is a schematic diagram of an arrangement showing the state in which an example of a solid immersion lens is held by a holding member.

As FIGS. 10 and 11 show schematic arrangements of respective examples of the solid immersion lenses, in the solid immersion lens having the above-mentioned convex portion 2, a part of the inclined surface of the convex portion 2 is used as the bonding area 5 of the lens holding member 20 and the lens holding member 20 is fixedly bonded to the bonding area 5 by an adhesive 6 made of a suitable material such as a ultraviolet-curing resin and a thermosetting resin. The lens holding member 20 is shaped like a doughnut having a circular hole surrounding the objective surface 3 as seen from the flat surface. The cross-sectional shape of the holding member 20 in the optical axis is shaped like a triangle in which an acute angle is formed toward the objective surface 3.

Since the radius of the objective surface 3 at the tip end of the convex portion 2 of the solid immersion lens 11 falls within a range of from approximately several micrometers to several 10 s of micrometers and the inclination angle of the convex portion 2, that is, the angle θ formed with respect to the objective surface 3 falls within a range of from approximately 10 degrees to 30 degrees, the height x between the lens objective surface 3 and the surface of the holding member 20 opposing the optical recording medium (not shown) lies within a range of from approximately several 10 s of micrometers to several 100 s of micrometers.

FIG. 10 shows an example in which the angle θ is approximately 20 degrees and FIG. 11 shows an example in which the angle θ is approximately 10 degrees. In FIGS. 10 and 11, elements and parts identical to those of FIG. 9 are denoted by identical reference numerals and therefore need not be described.

A study of the results on the above-described table 1 and FIGS. 10 and 11 reveals that the bonding area is decreased as the inclination angle θ of the convex portion 2 is decreased.

Specifically, when the inclination angle θ is large relatively, as shown k in FIG. 10, the height difference x from the objective surface 3 to the edge portion 4 of the spherical portion 1 is large relatively and the bonding area 5 can be maintained. On the other hand, as shown in FIG. 11, when the inclination angle θ is relatively small, the height difference x from the objective surface 3 to the edge portion 4 of the spherical portion 1 becomes relatively small. As a result, it is to be understood that the area of the bonding area 5 is evidently decreased as compared with the example of FIG. 10.

Further, as shown in the example of FIG. 11, when the inclination angle θ of the convex portion 2 is small and the height difference between the objective surface 3 and the surface in which the holding member 20 opposes the optical recording medium is small, a space between the holding member 20 and the optical recording medium also is decreased. In this case, in order to maintain a certain amount of a tilt margin between the optical recording medium and the holding member 20, the size of the holding member 20 should be suppressed from being increased and hence the bonding area is decreased more.

For example, when the height difference between the objective surface 3 of the solid immersion lens and the surface in which the holding member 20 opposes the optical recording medium is selected to be 50 μm as described above, as shown on the above-described table 1, if the inclination angle θ is 30 degrees, then the length y' of the bonding area of approximately 400 μm can be maintained. However, if the inclination angle θ is 10 degrees, then it is to be understood that the height difference x' of only 20 μm and the length y' of only about 120 μm can be maintained.

When the holding member 20 is to be bonded to the very small area as described above, the bonding area is small so that the holding member 20 is unavoidably bonded to the small bonding area very unstably in actual practice.

To solve this problem, according to the present invention, the difference-in-level portion or the concave portion is formed at least on a part of the convex portion.

First, examples in which the concave portion is formed on the bonding area of the convex portion with the holding member will be described with reference to FIGS. 12 to 15.

Figure 12:
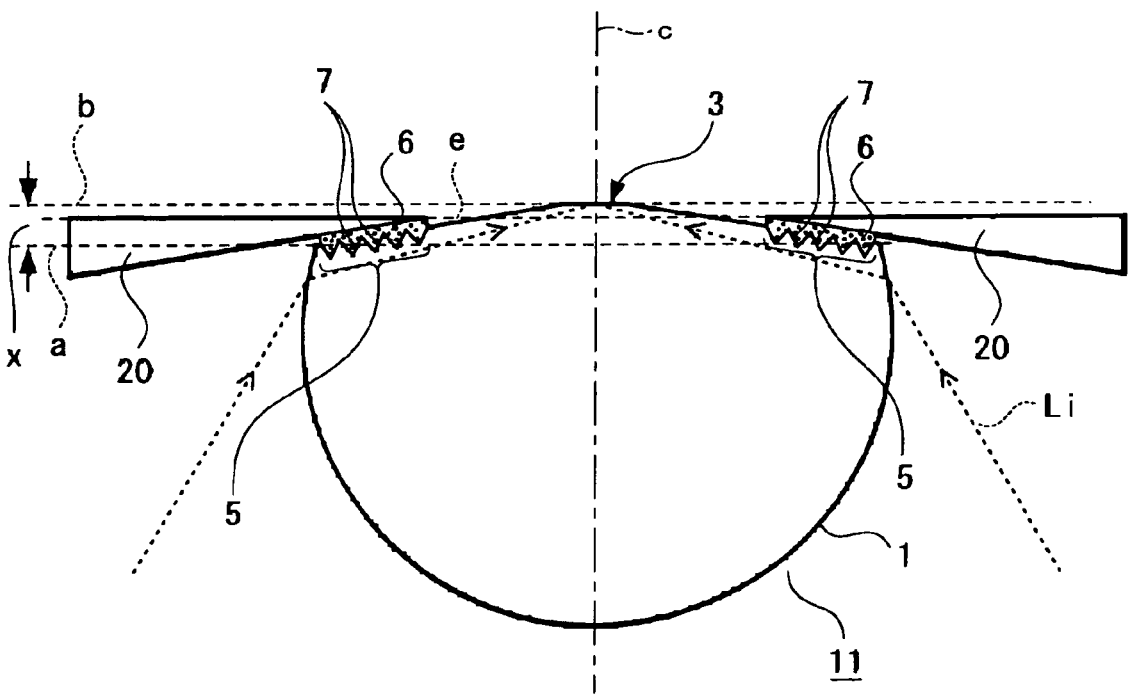
FIG. 12 is a schematic cross-sectional view showing an arrangement of an example of a solid immersion lens according to the present invention.

FIG. 12 shows an example in which the convex portion 2 is shaped like a circular cone portion, for example, a concave portion 7 having a triangular cross-section is formed on the bonding area 5 of the conical inclined surface of the holding member 20. When the concave portion 7 is formed on the bonding area 5 as described above, the bonding area with the adhesive 6 can be increased by forming very small uneven surfaces on the bonding area 5 and hence the solid immersion lens 11 can be held on the holding member 20 sufficiently strongly as compared with the related art.

When the concave portion 7 is processed, it is preferable that the concave portion 7 should be processed by a focus ion beam processing method based on a focus ion beam processing system such as focus ion beam processing inspection system FB-2100 (trade name) made by HITACHI LTD. When the concave portion 7 is formed by the focus ion beam processing method as described above, the shape of the concave portion 7, such as its depth, can be formed with high accuracy and it is possible to avoid incident light, shown by a broken line arrow Li, introduced into the solid immersion lens 11 from being affected. In FIG. 12, elements and parts identical to those of FIG. 9 are denoted by identical reference numerals and therefore need not be described.

Figure 13:
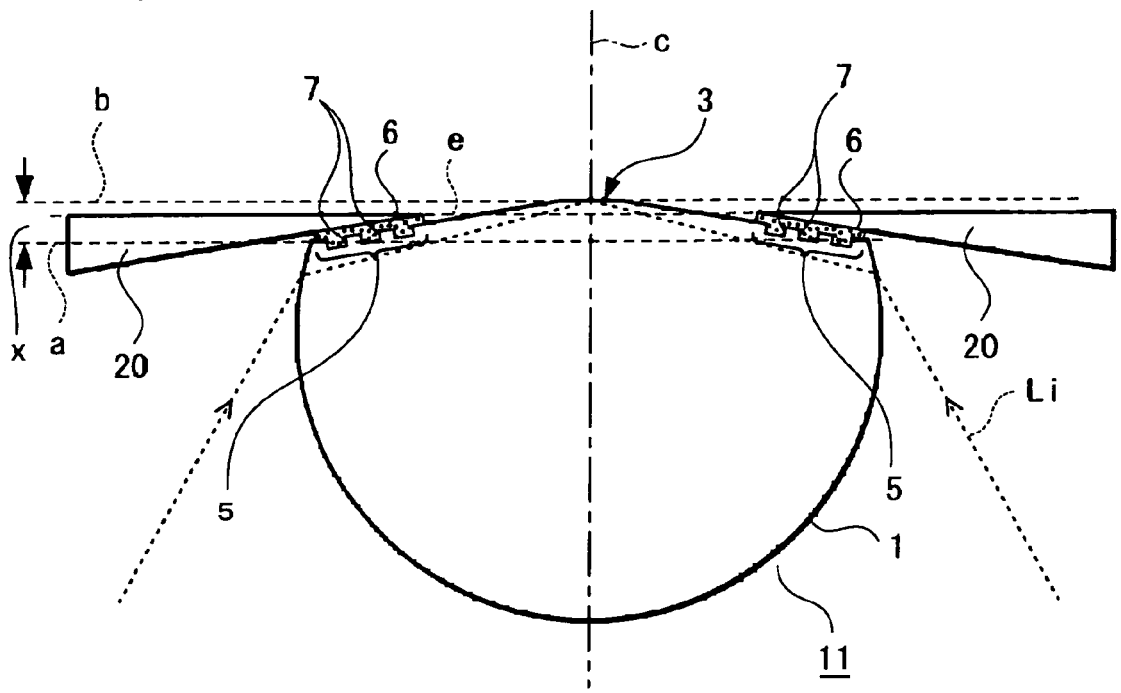
FIG. 13 is a schematic cross-sectional view showing an arrangement of other example of a solid immersion lens according to the present invention.

FIG. 13 shows an example in which the concave portion 7 is shaped so as to have a square cross-section. Also in this case, by providing the concave portion 7, the bonding area in this bonding area 5 can be increased similarly and it becomes possible to fixedly bond the solid immersion lens 11 to the holding member with sufficiently large strength.

In FIG. 12, elements and parts identical to those of FIG. 11 are denoted by identical reference numerals and therefore need not be described.

As described above, when the convex portion 2 is shaped like any one of a circular cone, a pyramid and a curved surface, it is possible to provide a solid immersion lens in which a bonding area can be maintained by a relatively simple shape and which can be held stably.

Figure 14:
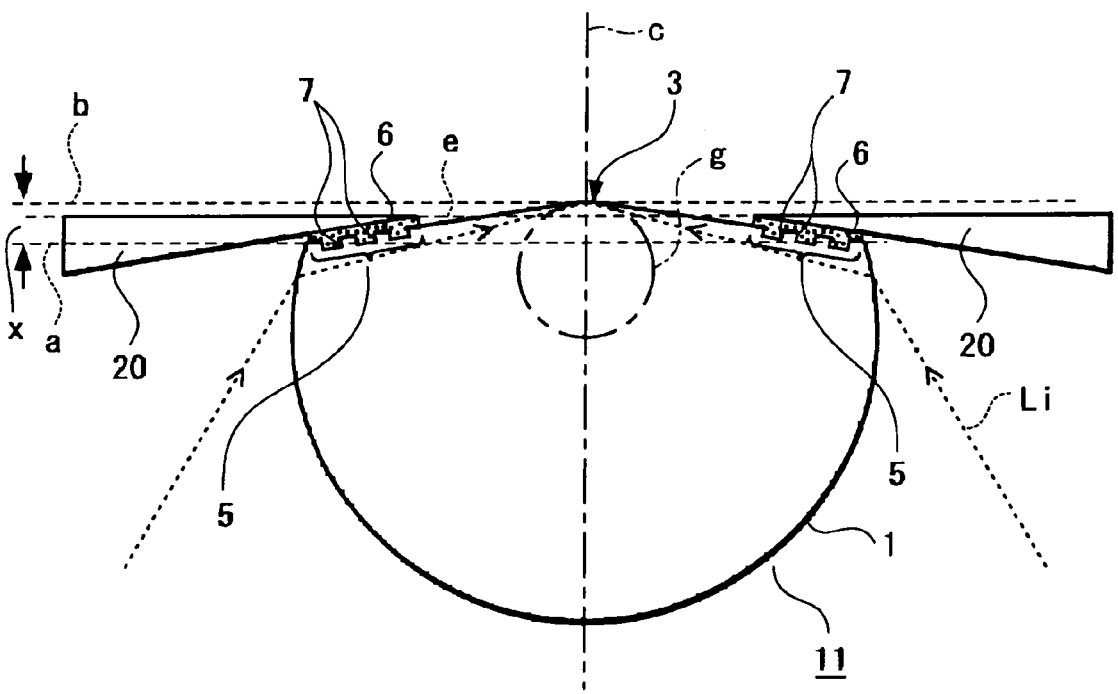
FIG. 14 is a schematic cross-sectional view showing an arrangement of a further example of a solid immersion lens according to the present invention.
Figure 15:
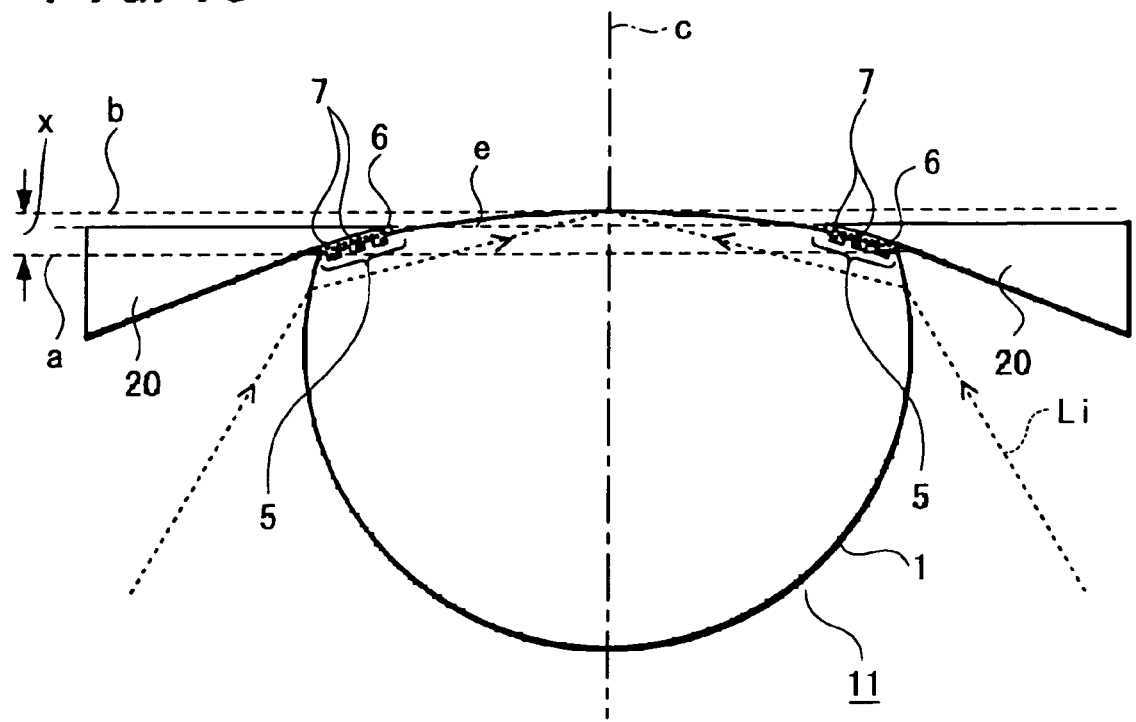
FIG. 15 is a schematic cross-sectional view showing an arrangement of yet a further example of a solid immersion lens according to the present invention.

The shape of the solid immersion lens 11 is not limited to those of the examples shown in FIGS. 12 and 13 and the spherical portion may be shaped as a hemispherical portion. Also, as shown in FIG. 14, for example, the shape of the solid immersion lens 11 may be similar to that of the aforementioned example of FIG. 7 in which the objective surface 3 is formed as a shape which substantially circumscribes a sphere, shown by a dot-and-dash line g, with a radius of r/n as shown in FIG. 14, for example. Further, as shown in FIG. 15, the convex portion 2 may be formed as the curved surface shape, that is, the convex portion 2 may be formed as a shape similar to that of the aforementioned example of FIG. 8. As described above, as shown in FIGS. 14 and 15, when the concave portion 7 is provided on the bonding area 5, it becomes possible to fixedly bond the solid immersion lens 11 to the holding member 20 with sufficiently large strength. In FIGS. 14 and 15, elements and parts identical to those of FIG. 12 are denoted by identical reference numerals and therefore need not be described.

As described above, when the concave portion 7 is formed at least on a part of the bonding area 5, as is clear from the comparison with the aforementioned example of FIG. 11, it becomes possible to increase the bonding area by a processed amount of the uneven area in the concave portion 7 of the convex portion 2. Therefore, since the solid immersion lens can be held stably, even when the solid immersion lens is made compact in size, it becomes possible to hold the solid immersion lens stably and hence a relative transport of the solid immersion lens with the optical recording medium and the like can be stabilized.

In particular, when the inclination angle θ of the convex portion 2 is made relatively small, that is, when the laser incidence angle θi to the solid immersion lens 11 is increased and the numerical aperture NA is increased or when the refractive index n of the solid immersion lens 11 is large, further, when the radius r of the solid immersion lens 11 is small, by providing the concave portion as described above, it is possible to maintain the bonding area by which the solid immersion lens 11 can be stably held to the holding member 20.

Next, an example in which the difference-in-level portion is formed on a part of the convex portion will be described. In the example shown in FIG. 16, a difference-in-level portion 8 formed on the convex portion 2 is composed of more than two inclined surfaces inclined with different angles relative to the optical axis c in the cross-section extending along the optical axis c of the solid immersion lens 11, that is, a first surface 9A and a second surface 9B, in that order, from the objective surface 3 in the illustrated example.

As described above, if the inclined portion of the convex portion 2 is processed with portions inclined with different angles relative to the optical axis, that is, portions with a plurality of inclination angles, even when the inclination angle of the convex portion 2 is increased from the optical axis in order to increase the numerical aperture of the solid immersion lens 11, by providing the inclined surface in which the inclination angle from the optical axis in the bonding area 5 relative to the lens holding member 20 is decreased, in this case, the second surface 9B, the bonding area with respect to the lens holding member 20 can be increased relatively in this inclined surface and hence it becomes possible to hold the solid immersion lens 11 to the lens holding member 20.

In this case, however, it is desirable that the inclination angle of the second surface 9B should be selected in consideration of the incidence angle θi so as not to interrupt the incident light Li onto the solid immersion lens 11.

Specifically, by the radius d of the objective surface 3, the inclination angle of the convex portion 2 of the solid immersion lens 11 can be formed with a margin relative to the incidence angle θi onto the solid immersion lens 11. In other words, by using this margin, it is possible to provide the second surface 9B of which inclination angle from the objective surface 3 is greater than that of the first surface 9A. As a result, the length of the inclined portion can be increased more so that the bonding area with respect to the holding member 20 can be maintained.

Also in this case, when the inclination angle of the convex portion is relatively small, when the incidence angle of incident light on the solid immersion lens is large, when the numerical aperture NA is large, when the refractive index of the solid immersion lens is large or when the radius of the solid immersion lens is small, it becomes possible to maintain the stable bonding area.

Figure 16:
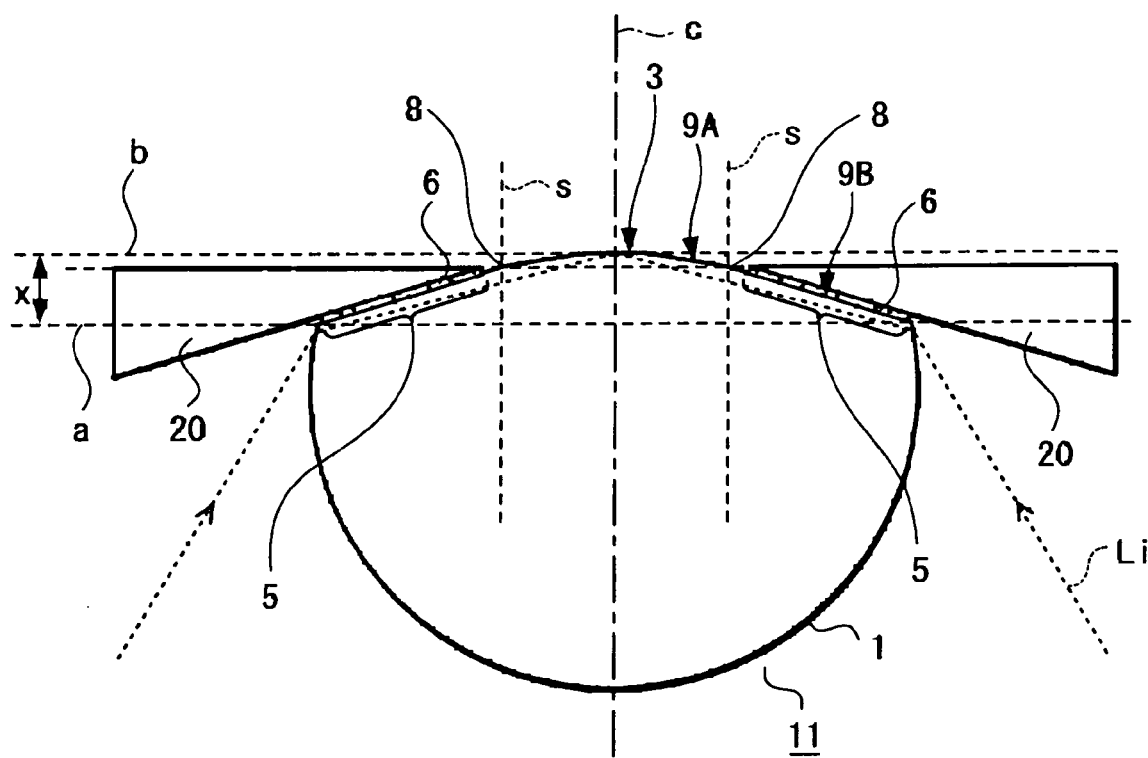
FIG. 16 is a schematic cross-sectional view showing an arrangement of still a further example of a solid immersion lens according to the present invention.

In FIG. 16, elements and parts identical to those of FIG. 12 are denoted by identical reference numerals and therefore need not be described.

Next, as inventive examples 1 and 2, examples in which the concave portion or the difference-in-level portion is formed without affecting incident light will be described.

INVENTIVE EXAMPLE 1

Figure 17:
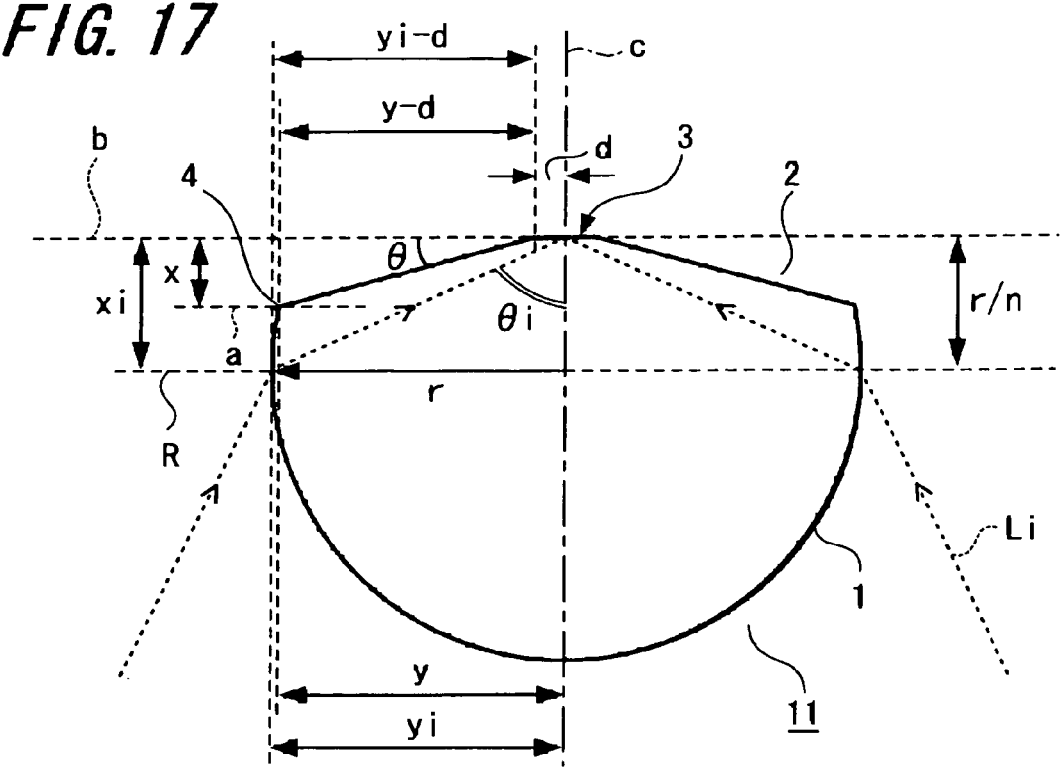
FIG. 17 is a schematic diagram to which reference will be made in explaining the shape of an example of a solid immersion lens.

As a solid immersion lens, a high refractive index glass material of S-LAH79 (trade name) made by OHARA INC., was used and as FIG. 17 shows a schematic arrangement, there was manufactured a solid immersion lens of the inventive example 1 in which the radius r of the solid immersion lens 11 was selected to be 0.45 mm, its thickness r (1+1/n) was selected to be 0.667 mm and the convex portion 2 on the objective side was shaped as a circular cone with an inclination angle of 20 degrees relative to the objective surface 3. At that time, the radius d of the objective surface 3 was selected to be 20 μm.

In this inventive example 1, while the height x from the objective surface 3 to the edge portion 4 of the spherical portion 1 was 155.0 μm, the height xi from the objective surface 3 to the incident position of the incident light Li was 216.6 μm. Accordingly, a very small concave portion shown in FIG. 12 was formed by cutting the portion of 61.6 μm of the difference between the heights x and xi according to machining based on the focus ion beam system and this concave portion was bonded to the lens holding member 20 of the solid immersion lens 11. In consequence, as shown in FIG. 10, it was confirmed that bonding strength was increased as compared with the case in which a concave portion was not formed by cutting according to machining.

INVENTIVE EXAMPLE 2

Figure 18:
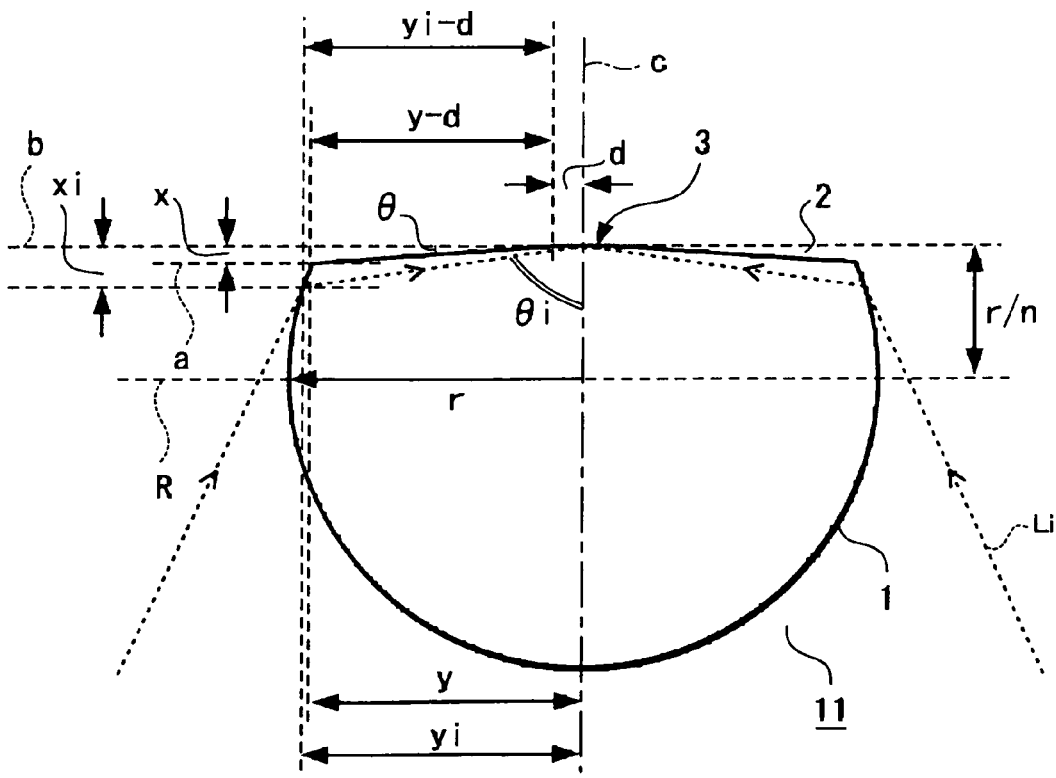
FIG. 18 is a schematic diagram to which reference will be made in explaining the shape of another example of a solid immersion lens.

Next, the inventive example 2 will be described. As a solid immersion lens, a high refractive index glass material of S-LAH79 (trade name) made by OHARA INC., was used and as shown in FIG. 18, there was manufactured a solid immersion lens of the inventive example 2 in which the radius r of the solid immersion lens 11 was selected to be 0.45 mm, its thickness r (1+1/n) was selected to be 0.667 mm and the convex portion 2 on the objective side was shaped as a circular cone with an inclination angle of 10 degrees relative to the objective surface 3. At that time, the radius d of the objective surface 3 was selected to be 20 μm.

At that time, while the height x from the objective surface 3 to the edge portion 4 of the spherical portion 1 was 71.6 μm, the height xi from the objective surface 3 to the incident position of the incident light Li was 130 μm. Accordingly, a difference-in-level shape shown in FIG. 16 was formed by processing the portion of 58.4 μm of the difference between the heights x and xi according to the focus ion beam system and this difference-in-level portion was bonded to the lens holding member 20 of the solid immersion lens 11. Consequently, it was confirmed that bonding strength was increased as compared with the case in which such difference-in-level portion is not formed.

Incidence angles θi, inclination angle θ, heights x of the edge portion and differences (xi−x) between the heights x and the heights xi of the incident position in these inventive examples 1 and 2 are shown on the following table 2.

TABLE 2

|  | Laser incidence angle θi (degree) | Inclination angle θ (degree) | Height difference from objective surface to edge portion x (μm) | Difference between x and xi (μm) |
| --- | --- | --- | --- | --- |
| Inventive example 1 | 64.3 | 20 | 155 | 61.6 |
| Inventive example 2 | 73.6 | 10 | 71.6 | 58.4 |

As described above, by properly selecting the depth of the concave portion formed on the bonding area in consideration of the height xi of the incident position and the height difference x from the objective surface to the edge portion of the lens, it is possible to maintain the bonding area without interrupting incident light and hence it becomes possible to strongly bond the solid immersion lens to the lens holding member.

As set forth above, according to the solid immersion lens of the present invention, the tilt margin with respect to the optical recording medium can be increased by providing the convex portion. Also, by forming the concave portion or the difference-in-level portion on at least a part of this convex portion, it becomes possible to maintain the sufficiently large bonding area between the solid immersion lens and the lens holding member.

Then, according to the present invention, a small solid immersion lens which can realize a focusing lens with a large numerical aperture can be held stably. Accordingly, stable transport of the solid immersion lens relative to the optical recording medium can be realized and hence it becomes possible to enhance stability of recording and reproduction. Thus, it becomes possible to construct a stable recording and reproducing system relative to the optical recording medium using the near field recording and reproducing system.

Further, since it is possible to realize a small and lightweight focusing lens by using the solid immersion lens according to the present invention, servo characteristics such as focusing servo, tracking servo and seek time can be improved. Hence, it becomes possible to make the optical pickup apparatus and the optical recording and reproducing apparatus become small in size, thin in thickness and high in performance.

As a result, according to the present invention, it becomes possible to realize an optical recording medium of a higher recording density and a larger storage capacity by using the near field recording and reproducing system.

The present invention is not limited to above-mentioned respective examples and it can be variously modified and changed without departing from the arrangement of the present invention by forming the cross-sectional shape of the concave portion provided in the convex portion, for example, as a corrugated shape, an irregular shape or a difference-in-level shape so that curved surfaces with different curvatures of radius may become adjacent to each other. In addition, it is also needless to say that the material, arrangement of the solid immersion lens, the shape of the lens holding member and like can be various modified and changed.

As described above, according to the solid immersion lens of the present invention, since the protrusive convex portion is provided on the object side of the solid immersion lens and the difference-in-level portion or the concave portion is provided at least on a part of this convex portion, the bonding area with the lens holding member can be increased and hence the solid immersion lens can be held by the lens holding member more stably as compared with the related art.

Further, according to the focusing lens, the optical pickup apparatus and the optical recording and reproducing apparatus of the present invention, the solid immersion lens for use with the focusing lens can be held stably and hence it is possible to provide an optical pickup apparatus and an optical recording and reproducing apparatus which can be stably transported relative to the optical recording medium by using the solid immersion lens with the large numerical aperture.

Furthermore, according to a method of forming a solid immersion lens of the present invention, a solid immersion lens which can stably be held comparatively can be formed with high accuracy without exerting an influence on incident light.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup apparatus, comprising:
at least a solid immersion lens and an optical lens with optical axes thereof being coincident with a light source and which are sequentially located from an objective side;
a focusing lens configured to converge light emitted from said light source to form a beam spot;
a convex portion provided on the objective side of said solid immersion lens so as to protrude toward an optical recording medium; and
at least one of a difference-in-level portion and a concave portion provided at least on a part of said convex portion, wherein said at least one of said difference-in-level portion and said concave portion is provided at least on a part of a bonding area of a holding member that holds said solid immersion lens.

2. The optical pickup apparatus according to claim 1, wherein said convex portion is shaped like any one of a circular cone shape, pyramid shape and a curved surface shape.

3. The optical pickup apparatus according to claim 1, further comprising:
a holding member configured to hold said solid immersion lens and wherein said concave portion is provided at least on a part of a bonding area of said holding member.

4. The optical pickup apparatus according to claim 1, further comprising:
an actuator configured to move said solid immersion lens in the focusing and/or tracking direction.

5. An optical recording and reproducing apparatus, comprising:
at least an optical pickup apparatus configured to concentrate light at the recording position of an optical recording medium by a focusing lens to record and/or reproduce said optical recording medium; and
control drive means for moving said focusing lens and said optical pickup apparatus in the focusing direction and/or tracking direction of said optical recording medium, said focusing lens including at least a solid immersion lens located on an objective side, a convex portion being provided on the objective side of said solid immersion lens so as to protrude toward said optical recording medium and said convex portion having at least one of a difference-in-level portion and a concave portion provided at least on a part thereof, wherein said at least one of said difference-in-level portion and said concave portion is provided at least on a part of a bonding area of a holding member that holds said solid immersion lens.

6. The optical recording and reproducing apparatus according to claim 5, wherein said convex portion is shaped like any one of a circular cone shape, pyramid shape and a curved surface shape.

7. The optical recording and reproducing apparatus according to claim 5, wherein said optical pickup apparatus includes a holding member configured to hold said solid immersion lens, said concave portion being provided at least on a part of a bonding area of said holding member.

8. An optical recording and reproducing apparatus according to claim 5, wherein said optical pickup apparatus includes an actuator configured to move said solid immersion lens in the focusing and/or tracking direction.

9. A solid immersion lens, comprising:
- a convex portion provided on an objective side of said solid immersion lens; and
- at least one of a difference-in-level portion and a concave portion provided at least on a part of said convex portion, wherein
- said at least one of said difference-in-level portion and said concave portion is provided at least on a part of a bonding area of a holding member that holds said solid immersion lens, and
- said difference-in-level portion is composed of more than two inclined planes inclined with different angles with respect to an optical axis in a cross-section extending along said optical axis of said solid immersion lens.

* * * * *